United States Patent

[11] 3,587,624

[72] Inventor James T. Holloway
 Whitewright, Tex.
[21] Appl. No. 861,856
[22] Filed Sept. 29, 1969
[45] Patented June 28, 1971

[54] SPRAY BOOM APPARATUS
 6 Claims, 7 Drawing Figs.
[52] U.S. Cl. .................................................. 137/344,
 239/167
[51] Int. Cl. ...................................................... B05b 9/02,
 E01h 3/02
[50] Field of Search ........................................ 239/164,
 166, 167, 168; 137/344; 74/(Inquired)

[56] References Cited
 UNITED STATES PATENTS
 2,548,482  4/1951  Kouril ............................ 239/164

2,605,135  7/1952  Torgerson ..................... 239/167
2,657,949  11/1953  Morrison ....................... 239/167
2,910,245  10/1959  Burroughs ..................... 239/167
2,995,307  8/1961  McMahon ..................... 239/167

Primary Examiner—Lloyd L. King
Assistant Examiner—Edwin D. Grant
Attorney—Scofield, Kokjer, Scofield and Lowe ABSTRACT: A spray boom apparatus for a farm implement having oversized tires. Elongate booms are supported from a T member which is pivotally received by an upright sleeve of the boom rack securely attached to the rear of the implement. Each boom extends laterally to a spray position parallel to the ground and approximately perpendicular to the direction of travel. When a boom is swung inwardly toward the rear or front of the implement, a roller connected to the T member rides upwardly on a cam track to elevate the boom with respect to the ground.

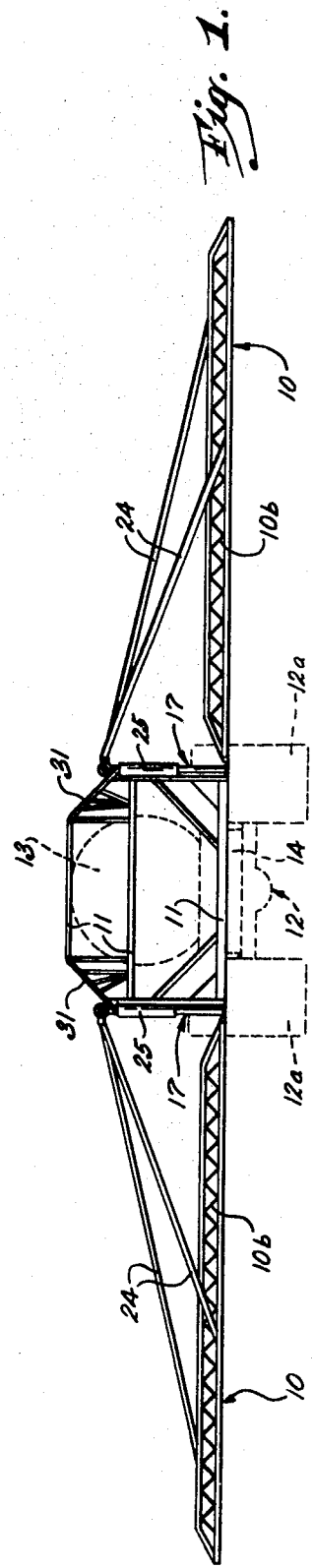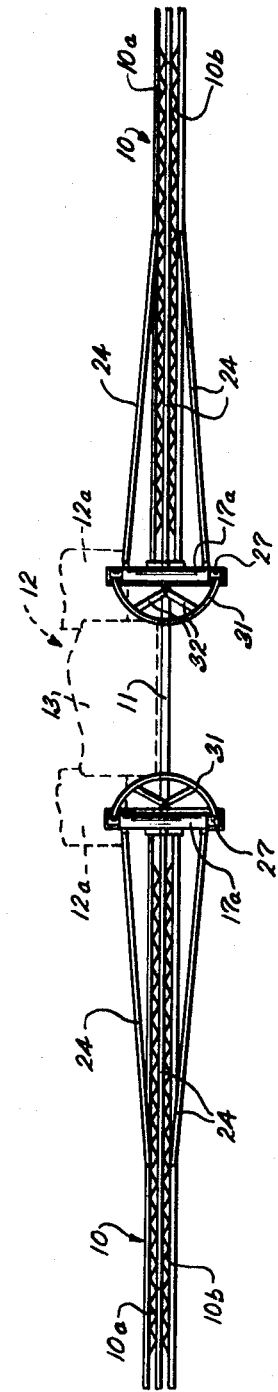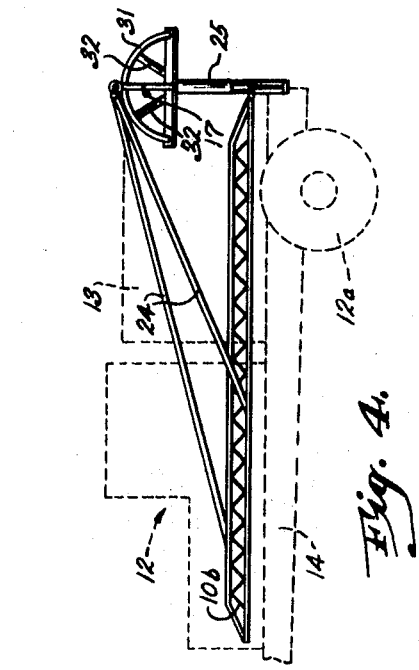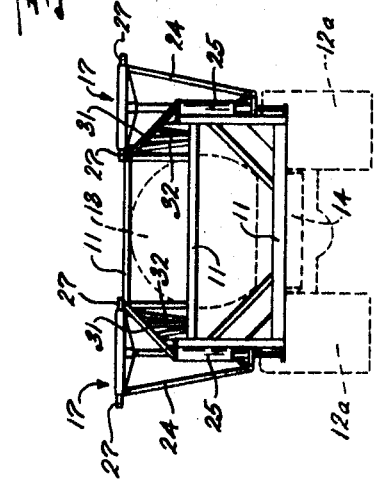
INVENTOR.
James T. Holloway

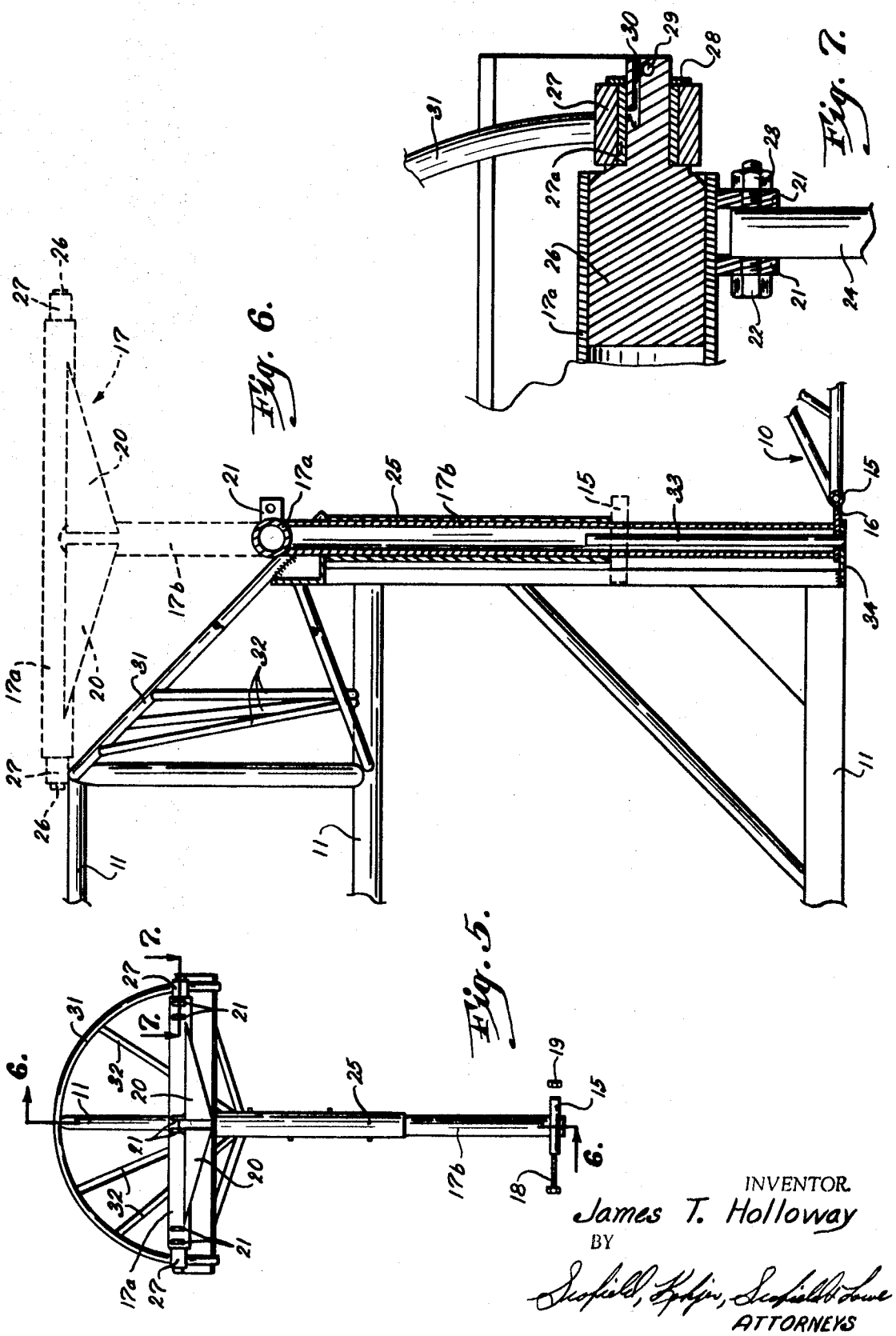

3,587,624

SPRAY BOOM APPARATUS

BACKGROUND OF THE INVENTION

In order to meet the need for increased land productivity required by the agricultural community, the art of applying fertilizers to fields has rapidly developed. It is common practice to apply liquid fertilizer to fields in the form of a spray.

Basically, the implement for spraying liquid fertilizer includes an oversized-tire vehicle on which is mounted a large tank containing fertilizer and a pumping or pressurizing apparatus to deliver liquid through hoses to a plurality of spray nozzles from which the fertilizer is discharged outwardly to the field. To spray as large an area as possible, the spray nozzles are mounted on elongate arms, commonly known as booms, extended laterally from the rear of the vehicle. With this arrangement, the implement can typically spray a 50-foot wide path when traveling through the field.

Since it is necessary to move the implement from one field to another, various schemes have been employed to stow the booms for road travel. However, all have certain drawbacks. Raising the booms to a vertical position prevents the implement from traveling under a low hanging object such as a bridge or power line. Swinging the booms to the rear of the implement creates a hazard for other vehicles on the road and also impairs the maneuverability of the implement. Likewise unsatisfactory, removing the booms from the implement is unnecessarily time consuming.

Therefore, a logical position is to swing the booms forwardly and inwardly alongside the vehicle for road travel. This arrangement, however, suffers from a disadvantage. During the spraying operation, it is desirable that the booms be in close proximity to the ground. If the booms are swung inwardly from the spray position, they must extend past the outer sides of the oversized tires, which results in a lateral width hazardous for road travel.

Farm implements employing spray booms have yet another disadvantage. Since it is desirable that the boom be positioned close to the ground, there is even present danger that the boom will strike an immovable object on the ground such as a post and become severely damaged.

SUMMARY OF THE INVENTION

The primary object of this invention is to provide for a farm implement, a spray boom apparatus having elongate booms on which can be mounted a plurality of spray nozzles and which is so constructed as to avoid the problems noted above. The booms are pivotally connected to the rear of the implement and, when extended laterally to a spray position, are in close proximity to the ground. Yet, when pivoted forwardly and inwardly to a road travel position, the booms are elevated above the oversized tires, resulting in an implement width safe for road travel.

Another object of the invention is to provide a spray boom apparatus of the character described wherein the booms are operable to be swung to the rear of the vehicle from the lateral spray position upon striking a stationary object in a field and wherein they automatically return to the spray position after disengaging the object.

An additional object of the invention is to provide a spray boom apparatus which is rugged in construction and durable in operation.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals indicate like parts in the various views:

FIG. 1 is a rear elevational view of a spray boom apparatus constructed in accordance with a preferred embodiment of this invention and operatively connected to a farm implement;

FIG. 2 is a plan view of the apparatus in the spray position;

FIG. 3 is a rear elevational view of the apparatus in the road travel position;

FIG. 4 is a side elevational view of the apparatus in the road travel position;

FIG. 5 is a side view of a portion of the apparatus;

FIG. 6 is an enlarged fragmentary view, partly sectional, along line 6–6 of FIG. 5 in the direction of the arrows; and FIG. 7 is an enlarged sectional view along line 7–7 of FIG. 5 in the direction of the arrows.

Referring to FIGS. 1 and 2, elongate spray booms 10 are shown in the lateral spray position extending from each side of a boom rack 11. The rack 11 is securely attached to the rear of a farm implement 12 having oversized rear tires 12a. A tank 13 suitable for holding liquid fertilizer is mounted on the vehicle bed 14.

Each boom 10 includes two elongate truss structures 10a and 10b which are joined to provide a structure for holding a hose to deliver fertilizer to a plurality of spray nozzles (not shown) connected along the boom 10, as best seen in FIGS. 5 and 6. The details of the boom itself and nozzles are not a part of my invention so further description is not given.

The innermost end of each boom 10 is connected to a tubular receiver 15 associated with the base plate 16 of an upright T member 17 by a bolt 18 and nut 19.

In the preferred embodiment of the invention, the T member 17 is of tubular construction. Triangular plates 20 are attached to each arm 17a of the T member to provide additional support with respect to the upright leg 17b of the T member. Disposed on the arm 17a are a plurality of pairs of support struts 21 which are connected by a bolt 22 and nut 23, as viewed in FIG. 7 to support braces 24 attached to each boom outwardly from the vehicle.

The upright leg 17b of the T member is received by a tubular sleeve 25 attached to the boom rack 11 in such a fashion as to allow the T member 17 to rotate and to slide within the sleeve 25. The sleeve 25 is shorter in length than the upright leg 17b of the T member and the lowermost end terminates above the uppermost height of the oversized tire 12.

Each arm 17a of the T member is fitted with a post extension 26 which receives a roller 27 held in place by a washer 28 and pin 29, as viewed in FIG. 7. A L-shaped passageway 30 within the post extension 26 is fitted with a Zerk fitting in order to apply grease to the engaging surfaces of the extension 26 and roller bushing 27a.

At each of the upper corners of the boom rack 11 is a cam track 31 which in plan view is of semicircular form. The cam tracks 31 are attached to the rack 11 and supported by a plurality of brace rods 32 extending from the rack 11. The ends of the cam tracks 31 terminate near the uppermost end of the sleeves 25. As best viewed in FIG. 6, each cam track 31 slopes inwardly from its sleeve 25.

When the boom is in the lateral spray position, each roller 27 of the T member 17 engages the cam track 31. When the T member 17 is rotated in either direction within the sleeve 25, one roller 27 moves upwardly on the cam track 31 thus elevating the leg 17b of the T member within the sleeve 25. Likewise, the boom 10 connected to the T member 17 is carried upwardly. When the force causing the T member 17 to rotate is removed, the weight of the T member 17 and boom 10 causes the roller 27 to move downwardly on the cam track 31 until both rollers 27 once again engage the cam track 31. The leg 17b of the T member is guided downwardly by a vertical guide post or extension 33 attached to a footing base 34 of the boom rack 11.

In operation, the spray boom assembly is, under field spraying circumstances, mounted to the rear of the spray vehicle. The booms extend laterally, as shown in FIGS. 1 and 2, to hold the spray nozzles in the proper spraying position.

In the event that either spray boom should strike an obstruction as the vehicle is advancing, the boom is free to swing about the vertical axis of the sleeve 25. As it does so, the roller 27 will ride upwardly on cam track 31, carrying the T member 17 with it and elevating the boom. When the obstruction is disengaged, the weight of the boom will return the boom to extended position by gravity, the cam track 31 in this instance acting as a cam to turn the boom back toward the extended position.

When it is desired to move the booms to the stored position for road travel, which is the condition illustrated in FIGS. 3 and 4, one need only grasp the outer end of a boom and swing it toward the forward end of the vehicle. As the boom swings forwardly, the forwardmost roller 27 will ride up the cam track 31, carrying with it the T member and boom. When the boom reaches the full forward position, it also has been raised sufficiently that it will clear the oversized tires 12a. Any sort of convenient holding means (not shown) can be utilized to releasably attach the boom to the vehicle.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

I claim:

1. A spray boom apparatus for a farm implement having oversized tires, said apparatus comprising:
   an elongate spray boom having a spray position which is transverse to the intended direction of travel of the implement;
   a boom rack attachable to the implement;
   a support member connected to the inner end of said boom, said member including an upright leg and a transverse leg;
   receiver means attached to said boom rack to slidably and rotatably receive the upright leg of said support means whereby to permit said boom to be swung away from said spray position when acted upon by an external force;
   cam means associated with said boom rack and which cooperates with said transverse leg to elevate said boom with respect to the ground when said boom is swung away from said spray position in response to an external force acting thereon; and said cam means operable to permit said boom to return by gravity to said spray position when an external force acting thereon is removed.

2. The apparatus as in claim 1, wherein said boom rack includes an upright guide extension which slidably and rotatably receives the upright leg of said support member to maintain said member in a vertical position as said member is rotatably raised or lowered with respect to the ground.

3. The apparatus as in claim 1, said support member having roller means connected to the outer end of said transverse leg to rollably engage said cam means.

4. The apparatus as in claim 1, wherein said upright leg intersects said transverse leg intermediate the ends of said transverse leg, each end of said transverse leg having roller means to rollably engage said cam means.

5. The apparatus as in claim 1, said receiver means comprises an upright tubular member in which the upright leg of said support means is slidably and rotatably received, the lower end of said tubular member terminating at least above the uppermost height to which said boom is elevated by said cam means.

6. The apparatus as in claim 1, said cam means comprises a track which, in plan view, is semicircular in shape and which inclines inwardly from said support member.